(12) United States Patent
Däuber et al.

(10) Patent No.: US 7,374,223 B2
(45) Date of Patent: May 20, 2008

(54) VEHICLE SEAT AND METHOD FOR CONTROLLING THE SAME

(75) Inventors: Markus Däuber, Eishingen (DE); Christian Götz, Plochingen (DE); Christian Mayer, Ditzingen (DE)

(73) Assignee: DaimlerChrysler AG, Stuttgart (DE)

( * ) Notice: Subject to any disclaimer, the term of this patent is extended or adjusted under 35 U.S.C. 154(b) by 292 days.

(21) Appl. No.: 10/492,186

(22) PCT Filed: Aug. 24, 2002

(86) PCT No.: PCT/EP02/09492

§ 371 (c)(1), (2), (4) Date: Oct. 12, 2004

(87) PCT Pub. No.: WO03/033294

PCT Pub. Date: Apr. 24, 2003

(65) Prior Publication Data

US 2005/0035634 A1    Feb. 17, 2005

(30) Foreign Application Priority Data

Oct. 13, 2001    (DE)    ............... 101 50 719

(51) Int. Cl.
*B60N 2/02*    (2006.01)
(52) U.S. Cl. ............... 296/65.11
(58) Field of Classification Search ............. 296/65.11; 297/105–111, 216.1, 311, 312, 337; 180/274, 180/271
See application file for complete search history.

(56) References Cited

U.S. PATENT DOCUMENTS

| | | | |
|---|---|---|---|
| 4,396,220 A | 8/1983 | Dieckmann et al. | |
| 5,149,165 A * | 9/1992 | Woolley | 296/68.1 |
| 5,328,234 A | 7/1994 | Daniel et al. | |
| 5,716,094 A | 2/1998 | Bhalsod et al. | |
| 6,644,723 B2 * | 11/2003 | Motozawa | 296/187.12 |
| 7,124,851 B2 * | 10/2006 | Smith et al. | 180/274 |
| 2006/0290160 A1* | 12/2006 | Tencer et al. | 296/68.1 |
| 2007/0080013 A1* | 4/2007 | Melz et al. | 180/274 |

FOREIGN PATENT DOCUMENTS

| | | |
|---|---|---|
| DE | 3023 035 A1 | 6/1980 |
| DE | 4110998 A * | 10/1992 |
| DE | 196 52 050 C1 | 12/1996 |
| DE | 199 42 489 A1 | 9/1999 |
| DE | 199 46 406 A1 | 9/1999 |
| DE | 1004012548 B * | 9/2006 |

(Continued)

OTHER PUBLICATIONS

English translation of Japanese Office Action dated Oct. 6, 2006.

*Primary Examiner*—H Gutman
(74) *Attorney, Agent, or Firm*—Crowell & Moring LLP

(57) ABSTRACT

Vehicle seat which effects a sideways movement of the occupant sitting on the vehicle seat during a lateral impact or directly before a lateral impact. The sideways movement takes place away from the side of the vehicle which faces the impact and toward the center of the vehicle, at least one seat cushion being transversely displaceable separately in relation to the seat components and in relation to the seat fixing elements for the sideways movement.

11 Claims, 1 Drawing Sheet

FOREIGN PATENT DOCUMENTS

| | | |
|---|---|---|
| EP | 1247724 A * | 10/2002 |
| GB | 2 334 006 A | 11/1999 |
| JP | 05300831 | 11/1993 |
| JP | 2001-191879 | 7/2001 |
| JP | 2001-206176 | 7/2001 |
| JP | 2006015855 A * | 1/2006 |
| WO | WO 99/15379 | 4/1999 |
| WO | WO 01/45979 A1 | 6/2001 |

* cited by examiner

VEHICLE SEAT AND METHOD FOR CONTROLLING THE SAME

This application is a National Phase of international patent application no. PCT/EP02/09492, filed Aug. 24, 2002, the entire disclosure of which is incorporated herein by reference. Priority is claimed based on German patent application no. 101 50 719.4, filed Oct. 13, 2001.

BACKGROUND AND SUMMARY OF THE INVENTION

The invention relates to a vehicle seat which effects a relative movement of the occupant sitting on it away from a side of the vehicle which faces a lateral impact toward a center of the vehicle during or immediately debore the lateral impact and to a method for controlling the vehicle seat.

DE 3023035 A1, which forms the generic type, discloses a vehicle seat which is suitable for considerably reducing the load on the occupant during a lateral impact. The seat comprises a seat bracket which permits a transverse movement of the seat relative to the seat mount in the vehicle during a lateral impact. The transverse movement can take place by means of a transverse displacement drive, with the result that, if a collision object intrudes into the vehicle, the vehicle occupant undergoes a relative movement away from the intrusion site and toward the center of the vehicle by the transverse movement of the entire seat in the direction of action of the impact. The transverse movement of the seat can be controlled in such a manner that the displacement of the seat is initiated before the forces arising from the intrusion have an effect, the displacement forces and the moment of displacement being adapted to give an optimum protective action.

It is the object of the invention to specify a vehicle seat and a method for controlling the vehicle seat, with which an occupant can be protected to the greatest possible extent by virtue of his displacement during a lateral impact. This object is achieved in respect of the vehicle seat wherein at least one seat cushion can be displaced separately in relation to other seat components and seat fixing elements transversely with respect to the longitudinal axis of the vehicle and is achieved in respect of the method by transverse displacement of the seat cushion begins before the moment of collision.

The invention is based on a vehicle seat in a motor vehicle which effects a relative movement of the occupant sitting on it away from the side of the vehicle which faces the impact toward the center of the vehicle during a lateral impact. As an alternative to this, the lateral displacement of the vehicle occupant may also already be initiated before the moment of collision. According to the invention, in order to displace an occupant, rather than the vehicle seat being displaceable as a whole, an individual seat component, in particular a seat cushion, is displaceable transversely with respect to the longitudinal axis of the vehicle independently of the rest of the vehicle seat. It is self-evident that also a plurality of seat cushions may be individually laterally displaceable. It is an advantage of the invention that the mass which is to be accelerated is reduced, this making a smaller displacement unit possible which can be accelerated and braked more rapidly. The constructional space to be kept for the displacement is reduced, since other seat components, for example the seat frame, are not displaced. A further advantage is that a larger displacement distance for an occupant is made possible than is the case if the entire seat is displaced. An additional advantage of a vehicle seat according to the invention is that parts of the vehicle seat which are not displaced, for example a seat frame or a mechanism for displacing the seat longitudinally, can absorb additional deformation energy.

BRIEF DESCRIPTION OF THE DRAWINGS

FIG. 1a shows an initial seat and occupant position; FIG. 1b shows displacement of the seat cushion and the lower portion of the occupant's body; FIG. 1c shows displacement of the seat back and the upper portion of the occupant's body.

DETAILED DESCRIPTION

Figure 1A:
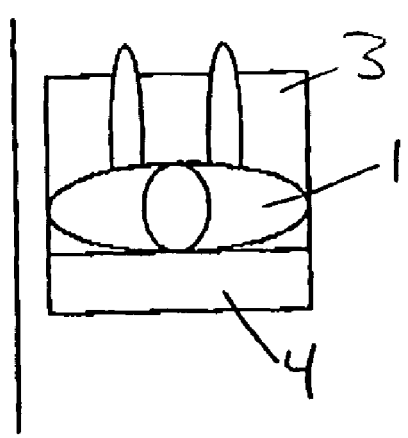
FIGS. 1a-1c schematically illustrate a vehicle seat, seat cushion and occupant displacement in accordance with an embodiment of the present invention.
Figure 1B:
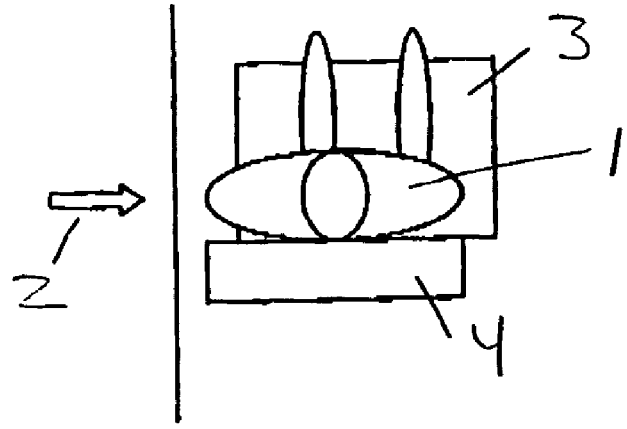
Figure 1C:
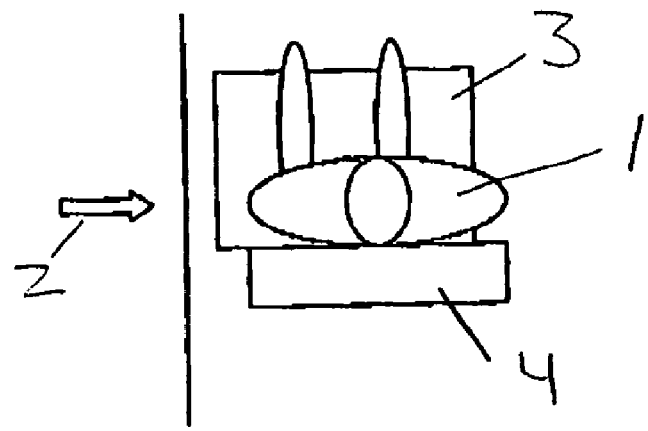

The displaceable seat cushions are parts of the vehicle seat which have a frictional or positive connection with the occupant, and so their displacement enables a transverse displacement of the occupant to take place. In different configurations of the vehicle seat, seat cushions of this type may be, for example, a seat surface, a seat back, a head restraint, a seat side cushion or an arm rest. A seat having the possibility of an independent displacement of two or more seat cushions which can be displaced simultaneously or offset in time makes it possible to further increase the protective action which can be achieved for an occupant. As shown in FIGS. 1a-1c, the transverse displacement of an occupant 1, i.e. the displacement of the desired body parts/body regions of the occupant in the direction of the center of the vehicle (toward the right in the figures), takes place by means of a transfer of force 2 to the occupant by the seat cushion 3 (FIG. 1b) or the seat back 4 (FIG. 1c).

In one development of the vehicle seat, a locking device is provided for a displaceable seat cushion 3, said locking device, following a transverse displacement which has taken place, securing the transversely displaced seat cushion in its end position. The locking device may be a mechanical device which is automatically effective after the seat cushion has reached a predeterminable end position. As an alternative to this, an activatable locking device which secures the seat cushion in an end position may be provided. In the case of the activatable locking device, a plurality of different end positions can be predetermined by a control unit, it being possible for the end positions to be predetermined as a function of occupant parameters and/or accident parameters. The advantage of this development is that the vehicle seat has a defined position after the transverse displacement of a seat cushion, which means that further protective measures for the occupant can be initiated in a specific manner. In one simple configuration, the locking of a transversely displaced seat cushion at the end of the displacement distance can take place by a structurally predeterminable increase in the friction at the end of a running rail.

If an advance determination of accident parameters, such as moment of accident and intrusion site, takes place with sufficient accuracy, then the transverse displacement of an occupant by means of a vehicle seat according to the invention can be adapted in respect of the time sequence and in respect of the displacement distances, in particular when there is a plurality of seat cushions which can be displaced independently of one another, to an accident, and, given appropriate recognition of the occupant, also to an occupant.

A method for controlling the vehicle seat according to the invention is specified below. In this method for the transverse displacement of a seat cushion of a vehicle seat according to the invention, the transverse displacement of the seat cushion is initiated before the moment of collision, in particular the actual transverse displacement already begins before the moment of collision and is not yet finished at the moment of collision, i.e. at the moment at which the collision object is just touching the vehicle. However, it is advantageous if the acceleration of the vehicle seat cushion in the direction of the center of the vehicle has already finished at the moment of collision. The transverse displacement of the occupant before the moment of collision enables him not only to be displaced out of the danger zone, but also to undergo an acceleration which is in the same direction as the acceleration which the vehicle undergoes because of the collision. If, during the duration of the substantial transfer of momentum from the collision object to the vehicle, the occupant is in a nonrigid connection with the vehicle, i.e., for example, is in a transverse movement which can be guided by a seat cushion, then some of the acceleration which the vehicle experiences because of the collision will no longer be transferred to the occupant who has already been accelerated beforehand. This reduces the acceleration peaks which are hazardous for an occupant. This method is particularly advantageous if the strength of the acceleration of the occupant and the moment at which the acceleration begins and at which the acceleration ends, and the displacement distance are adapted by means of parameters relevant to the accident, for example the accident severity, collision speed, occupant's weight and occupant's height. An adaptation of the transverse displacement of an occupant to an accident situation can take place substantially more easily and effectively by means of the displacement of one or more seat cushions than is possible by means of a displacement of the entire vehicle seat.

The moment which is situated by the triggering time t0 before the moment of collision turns out to be an advantageous moment for the triggering of the transverse displacement of a seat cushion. In this case, the triggering time t0 is specified as $t_0 = t_1 + ((-v_k(vk^2 + 2 a_{km} s_{k1})0.5) a_{km}-1) + t_3$. The variables occurring in this equation for determining the triggering time t0 are: $t_1$ is equal to the sum of the delay times of the entire system for the transverse displacement of the seat, $t_3$ is the displacement time, i.e. the time during which the seat cushion moves toward the center of the vehicle, $v_k$ is the speed at which the collision object moves in the direction of the vehicle seat at the moment of collision, $a_{km}$ is an average deceleration of the collision object during the course of the collision, and $s_{k1}$ is the distance which the collision object covers during the course of the collision from the vehicle outer skin into the vehicle interior up to the moment of maximum transfer of momentum to the occupant. The triggering time $t_0$ may also be expanded by a constant which, for example, is specific to the vehicle. Depending on the quality, the up-to-date nature and the amount of parameters which are available, the moment of triggering $t_0$ can be adapted to an accident by the above algorithm being expanded in nonlinear fashion or being supplemented by further parameters, such as, for example, the mass of the collision object or the structural rigidity of the vehicle at the point of impact. It has been found that the optimum acceleration values for a seat cushion lie above 5 g, in order to move an occupant sufficiently rapidly out of the danger zone, and, on the other hand, acceleration values over 10 g do not effect an gain in the speed of transverse displacement of the occupant, which justifies the measures required for this. A distance of between 80 mm and 120 mm is advantageous as the displacement distance, that is as the maximum possible distance by which a seat cushion is moved in the direction of the center of the vehicle. Displacement distances significantly below 80 mm do not move an occupant sufficiently far from the danger zone, and displacement distances above 120 mm cause an occupant to be subjected to too severe a load by means of the transverse displacement. In addition, very great displacement distances are frequently not possible simply for space reasons. The displacement time, i.e. the duration in which the seat cushion is moving sideways, is preferably between 100 ms and 150 ms.

The invention claimed is:

1. A vehicle seat which effects a relative movement of an occupant sitting on it away from a side of the vehicle which faces a lateral impact toward a center of the vehicle during or immediately before the lateral impact, wherein at least one seat cushion can be displaced separately in relation to other seat components.

2. The vehicle seat as claimed in claim 1, wherein the separately displaceable seat cushion is formed by a seat surface.

3. The vehicle seat as claimed in claim 1, wherein the separately displaceable seat cushion is formed by a seat back.

4. The vehicle seat as claimed in claim 1, wherein a locking device is provided which, after a transverse displacement has taken place, secures the transversely displaced seat cushion in an end position.

5. A method for controlling a vehicle seat comprising the step of:
   providing a seat in a vehicle which effects a relative movement of an occupant sitting on the seat away from a side of the vehicle which faces a lateral impact toward a center of the vehicle during or immediately before the lateral impact,
   wherein at least one seat cushion can be displaced separately in relation to other seat components, and
   wherein the transverse displacement of the seat cushion begins before the moment of collision.

6. The method as claimed in claim 5, wherein the transverse displacement of the seat cushion is still continuing at the moment of collision.

7. The method as claimed in claim 6, wherein an acceleration of the seat cushion toward the center of the vehicle has already finished at the moment of collision.

8. The method as claimed in claim 5, wherein the transverse displacement of the seat cushion is triggered by triggering time to before the moment of collision,
   the triggering time being $t_0 = t_1 + ((-v_k (v_k^2 + 2 a_{km} s_{k1})^{0.5}) a_{km}^{-1}) + t_3$, and
   $t_1$ being the sum of the delay times of the transverse displacement of the seat cushion, and
   $t_3$ being the displacement time over which the displacement of a seat cushion lasts, and
   $v_k$ being the speed of a collision object at the moment of collision, and
   $a_{km}$ being an average deceleration of the collision object during the course of the collision,
   and $s_{k1}$ being the distance which the collision object covers during the course of the collision from the outer skin of the vehicle into the vehicle interior up to the moment of maximum transfer of momentum to the occupant.

9. The method as claimed in claim 8, wherein the displacement time $t_3$ is between 100 ms and 150 ms.

10. The method as claimed in claim 8, wherein the displacement distance is between 80 mm and 120 mm.

11. The method as claimed in claim 9, wherein the displacement distance is between 80 mm and 120 mm.

* * * * *